US011040581B2

(12) United States Patent
Tanada

(10) Patent No.: US 11,040,581 B2
(45) Date of Patent: Jun. 22, 2021

(54) PNEUMATIC TIRE

(71) Applicant: SUMITOMO RUBBER INDUSTRIES, LTD., Kobe (JP)

(72) Inventor: Kenichiro Tanada, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 456 days.

(21) Appl. No.: 15/806,622

(22) Filed: Nov. 8, 2017

(65) Prior Publication Data

US 2018/0126800 A1  May 10, 2018

(30) Foreign Application Priority Data

Nov. 9, 2016 (JP) .............................. JP2016-218512

(51) Int. Cl.
  B60C 15/06   (2006.01)
  B60C 15/024  (2006.01)
  B60C 15/00   (2006.01)
  B60C 13/00   (2006.01)

(52) U.S. Cl.
  CPC ............. B60C 15/06 (2013.01); B60C 13/00 (2013.01); B60C 15/024 (2013.01); B60C 15/0027 (2013.01); B60C 15/0607 (2013.01); B60C 2013/006 (2013.01); B60C 2013/007 (2013.01); B60C 2015/0614 (2013.01)

(58) Field of Classification Search
  CPC ................ B60C 15/06; B60C 15/0607; B60C 2015/0614; B60C 15/02; B60C 15/024; B60C 15/0635; B60C 2015/0617; B60C 2015/0678
  USPC ....................................................... 152/543
  See application file for complete search history.

(56) References Cited

U.S. PATENT DOCUMENTS 5,476,129 A * 12/1995 Shoyama ................. B60C 3/04
                                                         152/454
6,345,657 B1 * 2/2002 Kato .................... B01D 17/005
                                                         152/539
8,530,575 B2 * 9/2013 Miyazaki .............. B60C 1/0025
                                                         524/847

(Continued)

FOREIGN PATENT DOCUMENTS

JP       09-058228 A    3/1997
JP       2004-106796 A  4/2004

(Continued)

OTHER PUBLICATIONS

Kawada, Akiko; Pneumatic Tire; (English Translation from Espacenet) (Year: 2013).*

Primary Examiner — Robert C Dye
Assistant Examiner — Edgaredmanuel Troche
(74) Attorney, Agent, or Firm — Birch, Stewart, Kolasch & Birch, LLP

(57) ABSTRACT

In a tire 2, chafers 8 each extend from a position axially outward of a corresponding one of beads 10 to a position radially inward of the corresponding one of the beads 10. Sidewalls 6 extend to positions between the beads 10 and the chafers 8, respectively. The chafers 8 extend to positions outward of ends 38 of turned-up portions 44 of a carcass ply 40 in the radial direction. When a side surface 50 represents a portion, of an outer surface of each chafer 8, which contacts with a flange of a rim, an outline of the side surface 50 has an arc C that extends from a heel of the bead 10 portion and projects inward.

12 Claims, 2 Drawing Sheets

(56) References Cited

U.S. PATENT DOCUMENTS

| | | | |
|---|---|---|---|
| 2004/0007305 A1* | 1/2004 | Ueyoko | B60C 15/06 152/552 |
| 2005/0045260 A1* | 3/2005 | Maruoka | B60C 15/0027 152/541 |
| 2013/0139943 A1* | 6/2013 | Todoroki | B60C 15/04 152/541 |
| 2014/0034205 A1 | 1/2014 | Yukawa | |
| 2014/0311649 A1* | 10/2014 | Oya | B60C 15/04 152/539 |
| 2015/0314654 A1* | 11/2015 | Nagahara | B60C 15/0603 152/517 |
| 2015/0367685 A1* | 12/2015 | Takahashi | B60C 9/18 152/525 |
| 2017/0057301 A1* | 3/2017 | Hashimoto | B60C 15/0045 |

FOREIGN PATENT DOCUMENTS

| | | | |
|---|---|---|---|
| JP | 2008-037367 A | | 2/2008 |
| JP | 2013-1283 A | | 1/2013 |
| JP | 2013-141963 A | | 7/2013 |
| JP | 2013141963 A | * | 7/2013 |
| WO | WO 2015/166805 A1 | | 11/2015 |

\* cited by examiner

PNEUMATIC TIRE

This application claims priority on Patent Application No. 2016-218512 filed in JAPAN on Nov. 9, 2016. The entire contents of this Japanese Patent Application are hereby incorporated by reference.

BACKGROUND OF THE INVENTION

Field of the Invention

The present invention relates to pneumatic tires. More specifically, the present invention relates to heavy duty pneumatic tires that are to be mounted to vehicles such as trucks and buses.

Description of the Related Art

It is important to reduce rolling resistance of a tire in order to reduce fuel consumption by the tire. When a tire rolls, deformation and restoration are repeated in the tire. Energy loss due to the deformation and restoration is a major factor in generation of rolling resistance of the tire. When a low heat generating rubber (rubber having a low loss tangent) is used for a tire, energy loss can be reduced.

A tire has a chafer disposed inward of a sidewall in the radial direction. The chafer comes into contact with a rim. When the tire rolls, a high force is applied to the chafer from the rim. In order to withstand the force, a rubber having a high complex elastic modulus is used for the chafer. Furthermore, wear due to contact with the rim is required to be reduced in the chafer. In order to advantageously achieve wear resistance, a rubber having a high loss tangent is generally used for the chafer. The loss tangent of a chafer is higher than the loss tangent of a sidewall.

A method for increasing the proportion of a low heat generating rubber used for a tire in order to reduce energy loss due to the tire, is known. It can be considered that, in the bead portion, a sidewall having a low loss tangent is made large and a chafer is made small. Examples of such a tire are disclosed in JP9-58228 and JP2008-37367.

In the tire disclosed in JP9-58228, the sidewall extends to a position between the chafer and the bead. Thus, the sidewall is made large and the chafer is made small.

Also in the tire disclosed in JP2008-37367, the sidewall extends to a position between the chafer and the bead. Furthermore, in the tire, the radially outer end of the chafer extends to a position outward of the end of the turned-up portion of the carcass ply.

Distortion is likely to concentrate near the end of the turned-up portion of the carcass ply due to deformation of the bead portion. Conventionally, moving of this portion has been inhibited by the end of the turned-up portion being covered by a chafer having a high complex elastic modulus. Thus, concentration of distortion on the end of the turned-up portion has been reduced. The tire in which the sidewall extends to a position between the chafer and the bead as disclosed in JP9-58228 has no chafer near the end of the turned-up portion. Under a load, the bead tends to be tilted outward. Under a load, the end of the turned-up portion may be greatly moved. This may cause such damage (PTL) as to remove the cord from the rubber at the end of the turned-up portion.

In the tire in which the radially outer end of the chafer extends to a position outward of the end of the turned-up portion as disclosed in JP2008-37367, the extended chafer can inhibit the end of the turned-up portion from being moved. Even when the sidewall extends to a position between the chafer and the bead, the end of the turned-up portion can be inhibited from being moved. However, for the chafer that generally contacts with a rim and is less likely to contact with air, weather resistance is considered to be less important than weather resistance of the sidewall. The chafer is formed from a rubber having a weather resistance that is lower than that of a rubber of the sidewall. In the tire in which the chafer extends to a position outward of the end of the turned-up portion, the extended portion constantly contacts with air also after the tire is mounted on a rim. A fine crack is likely to occur in this portion due to deterioration caused mainly by ozone. This portion is greatly distorted when the tire is inflated or running. This distortion causes the fine crack to grow. This deteriorates the quality of appearance of the tire.

An object of the present invention is to provide a pneumatic tire that allows reduction of rolling resistance and inhibition of PTL without deteriorating the quality of appearance.

SUMMARY OF THE INVENTION

A pneumatic tire according to the present invention includes: a pair of sidewalls; a pair of beads: a pair of chafers; and a carcass. Each chafer extends from a position axially outward of a corresponding one of the beads to a position radially inward of the corresponding one of the beads. The sidewalls extend to positions between the beads and the chafers, respectively. The carcass includes a carcass ply. The carcass ply includes a main portion that extends from one of the beads to the other of the beads, and turned-up portions that extend in a radial direction in portions axially outward of the beads. The chafers extend to positions outward of ends of the turned-up portions in the radial direction. When a side surface represents a portion, of an outer surface of each chafer, which contacts with a flange of a rim, an outline of the side surface has an arc C that extends from a heel of the bead portion and projects inward. A complex elastic modulus Es of each sidewall is less than a complex elastic modulus Ec of each chafer. A loss tangent LTs of each sidewall is less than a loss tangent LTc of each chafer.

In the tire according to the present invention, the sidewall having a low loss tangent extends to a position between the bead and the chafer. In the tire, the chafer having a high loss tangent is made small. In the tire, energy loss is reduced. In the tire, rolling resistance is low.

In the tire according to the present invention, the chafer having a high complex elastic modulus extends to a position outward of the end of the turned-up portion in the radial direction. The chafer inhibits a portion near the end of the turned-up portion from being moved. The chafer reduces concentration of distortion on the end of the turned-up portion. In the tire, PTL is inhibited.

In the tire according to the present invention, the outline of the side surface of the chafer includes the arc C that extends outward from the heel of the bead portion in the radial direction and projects inward. The shape allows the bead portion and a rim to be in close contact with each other when the tire is mounted on the rim. Furthermore, the sidewall, which extends to a position between the bead and the chafer, allows the flange and the chafer in which the outline of the side surface includes the arc C to effectively come into close contact with each other. In the tire, the arc C formed in the outline of the side surface and the sidewall that extends to a position inward of the chafer in the axial direction effectively inhibits the bead portion from being moved. Distortion is inhibited in a portion, of the chafer, outward of the end of the turned-up portion. Even in a portion, of the chafer, which contacts with air, crack is inhibited from growing. In the tire, the excellent quality of the appearance is maintained.

Preferably, when Lc represents a normal line, of the arc C, which is drawn from a midpoint Po of the arc C, each sidewall extends to a position inward of the normal line Lc in the radial direction.

Preferably, a curvature radius R of the arc C is not less than 20 mm and not greater than 50 mm.

Preferably, at the ends of the turned-up portions, a ratio (WAc/WA) of a thickness WAc of each chafer to a thickness WA obtained by the thickness of each chafer and a thickness of each sidewall being added to each other, is not less than 0.3 and not greater than 0.6.

Preferably, a thickness WAc of each chafer is not less than 2 mm and not greater than 6 mm at the ends of the turned-up portions.

Preferably, a length L from a radially inner end of the arc C to a radially outer end of a corresponding one of the chafers is not less than 35 mm and not greater than 55 mm.

Preferably, a minimal value Y of a thickness of each chafer in the arc C portion, is not less than 2.0 mm.

Preferably, a ratio (WB/WC) of a thickness WB, at a radially outer end of the arc C, obtained by a thickness of each chafer and a thickness of each sidewall being added to each other, relative to a thickness WC, at a midpoint Po of the arc C, obtained by a thickness of each chafer and a thickness of each sidewall being added to each other, is not less than 1.3 and not greater than 3.0.

Preferably, the complex elastic modulus Es is not less than 2.0 MPa and not higher than 8.0 MPa, and the complex elastic modulus Ec is not less than 6.0 MPa and not higher than 16 MPa.

Preferably, the loss tangent LTs is not less than 0.03 and not higher than 0.1, and the loss tangent LTc is not less than 0.12 and not higher than 0.18.

Preferably, the tire is used for a rim in which an angle of a seat surface of the rim relative to an axial direction is 15°.

DESCRIPTION OF THE PREFERRED EMBODIMENTS

The following will describe in detail the present invention based on preferred embodiments with reference where appropriate to the accompanying drawing.

Figure 1:
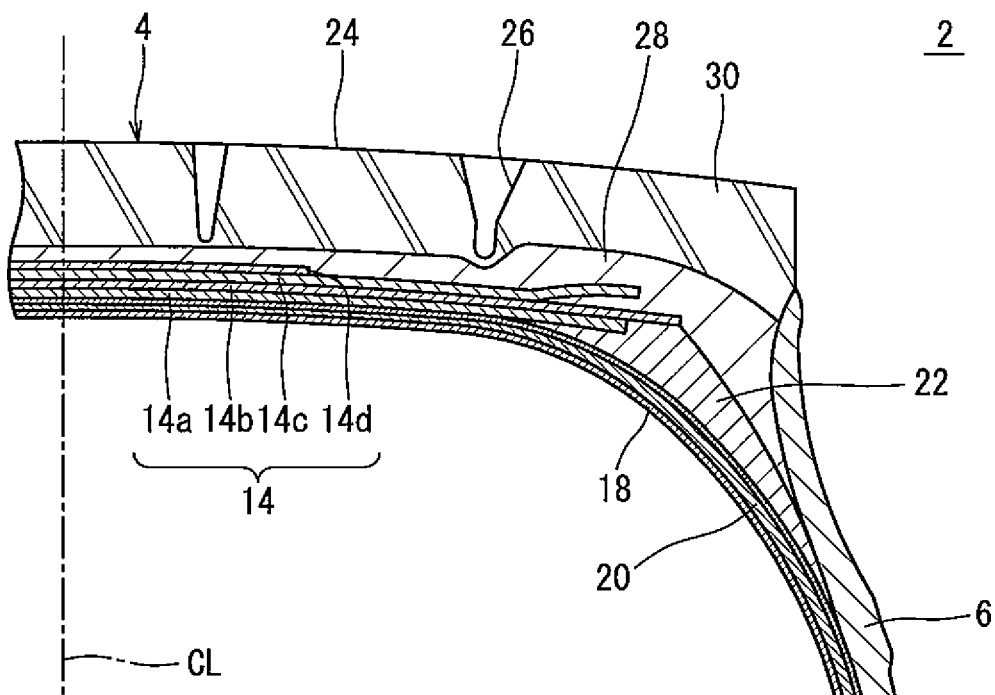
FIG. 1 is a cross-sectional view of a part of a tire according to one embodiment of the present invention.

FIG. 1 shows a pneumatic tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. The tire 2 has a shape that is symmetric about the equator plane except for a tread pattern.

The tire 2 includes a tread 4, a pair of sidewalls 6, a pair of chafers 8, a pair of beads 10, a carcass 12, a belt 14, a pair of fillers 16, an inner liner 18, an insert 20, and a pair of cushion layers 22. The tire 2 is of a tubeless type. The tire 2 is mounted to a truck, a bus, or the like. The tire 2 is a heavy duty tire. In the present embodiment, the tire 2 is mounted on a rim in which an angle of a seat surface relative to the axial direction is 15°.

The tread 4 has a shape that projects outward in the radial direction. The tread 4 forms a tread surface 24 that comes into contact with a road surface. The tread surface 24 has grooves 26 formed therein. A tread pattern is formed by the grooves 26. The tread 4 includes a base layer 28 and a cap layer 30. The cap layer 30 is disposed outward of the base layer 28 in the radial direction. The cap layer 30 is layered over the base layer 28. The base layer 28 is formed from a crosslinked rubber having an excellent adhesiveness. A typical base rubber of the base layer 28 is a natural rubber. The cap layer 30 is formed from a crosslinked rubber having excellent wear resistance, heat resistance, and grip performance.

Each sidewall 6 extends almost inward from the end of the tread 4 in the radial direction. The radially outer end of the sidewall 6 is joined to the tread 4. The radially inner end of the sidewall 6 is joined to the chafer 8. The sidewall 6 extends to a position between the bead 10 and the chafer 8. The radially inner end of the sidewall 6 is disposed outward of the bead 10 in the axial direction. The radially inner end of the sidewall 6 is disposed inward of the chafer 8 in the axial direction.

The sidewall 6 is formed from a crosslinked rubber having an excellent weather resistance. The sidewall 6 is superior to the chafer 8 in weather resistance. The sidewall 6 is constantly exposed to air in general. Deformation and restoration are repeated in the sidewall 6 during running. In the sidewall 6 having an excellent weather resistance, also in such a condition, crack is inhibited from occurring.

The sidewall 6 is softer than the chafer 8. A complex elastic modulus Es of the sidewall 6 is lower than a complex elastic modulus Ec of the chafer 8. The sidewall 6, which is softer, contributes to excellent ride comfort.

In the present invention, the complex elastic moduli Es and Ec, and a loss tangent LTs of the sidewall 6 and a loss tangent LTc of the chafer 8 described below are measured in compliance with the standard of "JIS K 6394", by using a viscoelasticity spectrometer ("VESF-3" manufactured by Iwamoto Seisakusho), under the following conditions.

Initial strain: 10%
Amplitude: ±2.0%
Frequency: 10 Hz
Deformation mode: tension
Measurement temperature: 30° C.

Each chafer 8 is disposed almost inward of the sidewall 6 in the radial direction. The chafer 8 is disposed outward of the bead 10 and the carcass 12 in the axial direction. The chafer 8 extends to a position inward of the bead 10 in the radial direction. When the tire 2 is mounted on a rim, the chafer 8 contacts with the rim. By the contact, a portion near the bead 10 is protected. Therefore, the chafer 8 is harder than the sidewall 6. The complex elastic modulus Ec of the chafer 8 is higher than the complex elastic modulus Es of the sidewall 6. The chafer 8 that comes into contact with the rim is formed from a crosslinked rubber having an excellent wear resistance. The loss tangent LTc of the chafer 8 is higher than the loss tangent LTs of the sidewall 6. Since the chafer 8 comes into contact with the rim, the chafer 8 rarely contacts with air. In general, weather resistance of the chafer 8 is considered to be less important than weather resistance of the sidewall 6. The chafer 8 is inferior to the sidewall 6 in weather resistance.

Each bead 10 is disposed inward of the sidewall 6 in the radial direction. The bead 10 is disposed inward of the chafer 8 in the axial direction. In the tire 2, the bead 10 includes a core 32, a first apex 34, and a second apex 36.

The core 32 is ring-shaped. The core 32 includes a wound non-stretchable wire. A typical material of the wire is steel. As shown in the drawings, in the present embodiment, the core 32 has a hexagonal outline. The outline of the core 32 may not be hexagonal. The core 32 may have a quadrangular outline. The core 32 may have a circular outline. The first apex 34 extends outward from the core 32 in the radial direction. The first apex 34 is tapered outward in the radial direction. The first apex 34 is formed from a highly hard crosslinked rubber. The second apex 36 is in contact with the first apex 34. The second apex 36 is disposed outward of the first apex 34 in the axial direction. The second apex 36 is disposed outward of the first apex 34 in the radial direction. The second apex 36 is tapered inward in the radial direction, and also tapered outward in the radial direction. The second apex 36 is formed from a crosslinked rubber. The second apex 36 is softer than the first apex 34. The second apex 36 reduces concentration of stress on an end 38 of a turned-up portion of the carcass 12.

The carcass 12 includes a carcass ply 40. The carcass ply 40 is extended on and between the beads 10 on both sides. The carcass ply 40 is turned up around the core 32. The carcass ply 40 includes: a main portion 42 that extends from one of the beads 10 to the other of the beads 10; and turned-up portions 44 each of which extends, in the radial direction, in a portion outward of the bead 10 in the axial direction. The main portion 42 extends along the inner sides of the tread 4 and the sidewall 6. The turned-up portion 44 is disposed between the bead 10 and the filler 16. The turned-up portion 44 extends along the outer side of the bead 10.

The carcass ply 40 includes multiple cords aligned with each other, and topping rubber, which is not shown. An absolute value of an angle of each cord relative to the equator plane is from 75° to 90°. In other words, the carcass 12 forms a radial structure. The cord is formed from steel. The carcass 12 may include two or more carcass plies 40.

The belt 14 is disposed inward of the tread 4 in the radial direction. The belt 14 is layered over the carcass 12. The belt 14 reinforces the carcass 12. In the tire 2, the belt 14 includes a first layer 14a, a second layer 14b, a third layer 14c, and a fourth layer 14d. The belt 14 is formed from the four layers. The belt 14 may be formed from three layers. As is apparent from the drawing, in the present embodiment, the second layer 14b has the greatest width in the axial direction among the four layers. In the present embodiment, the width, in the axial direction, of the second layer 14b is the width, in the axial direction, of the belt 14. The width, in the axial direction, of the belt 14 is preferably not less than 0.7 times the maximum width of the tire 2.

Each of the first layer 14a, the second layer 14b, the third layer 14c, and the fourth layer 14d includes multiple cords aligned with each other, and topping rubber, which is not shown. Each cord is formed from steel. The cord is tilted relative to the equator plane. A direction in which the cord of the first layer 14a is tilted relative to the equator plane is the same as a direction in which the cord of the second layer 14b is tilted relative to the equator plane. A direction in which the cord of the second layer 14b is tilted relative to the equator plane is opposite to a direction in which the cord of the third layer 14c is tilted relative to the equator plane. A direction in which the cord of the third layer 14c is tilted relative to the equator plane is the same as a direction in which the cord of the fourth layer 14d is tilted relative to the equator plane. The absolute value of an angle of the cord relative to the equator plane is from 15° to 70°.

Each filler 16 is turned up around the core 32. The filler 16 is layered over the carcass ply 40. A first end of the filler 16 is disposed inward of the bead 10 in the axial direction. A second end of the filler 16 is disposed outward of the bead 10 in the axial direction. The filler 16 includes multiple cords aligned with each other, and topping rubber. Each cord is formed from steel. The filler 16 is also referred to as a steel filler 16. The filler 16 can contribute to durability of the tire 2.

The inner liner 18 is disposed inward of the carcass 12. The inner liner 18 is joined to the inner surface of the insert 20. The inner liner 18 is formed from crosslinked rubber. A rubber excellent in airtightness is used for the inner liner 18. A typical base rubber of the inner liner 18 is an isobutylene-isoprene-rubber or halogenated isobutylene-isoprene-rubber. The inner liner 18 contributes to maintaining of an internal pressure of the tire 2.

The insert 20 is disposed between the carcass 12 and the inner liner 18. The insert 20 is formed from a crosslinked rubber having an excellent adhesiveness. The insert 20 is firmly joined to the carcass 12, and is firmly joined also to the inner liner 18. The insert 20 prevents the inner liner 18 from being removed from the tire 2.

Each cushion layer 22 is layered over the carcass 12 near the end of the belt 14. The cushion layer 22 is formed from a soft crosslinked rubber. The cushion layer 22 absorbs stress at the end of the belt 14. The cushion layer 22 inhibits lifting of the belt 14.

In FIG. 1, a solid line BBL represents a bead base line. The bead base line BBL corresponds to a line that defines the rim diameter (see JATMA) of a rim. The bead base line BBL extends in the axial direction. A double-headed arrow Hc represents a height, in the radial direction, from the bead base line BBL to an outer end 46 of the chafer 8. A double-headed arrow Hp represents a height, in the radial direction, from the bead base line BBL to the end 38 of the turned-up portion 44. In the tire 2, the chafer 8 extends to a position outward of the end 38 of the turned-up portion 44. That is, a ratio (Hc/Hp) of the height Hc to the height Hp is greater than 1.

Figure 2:
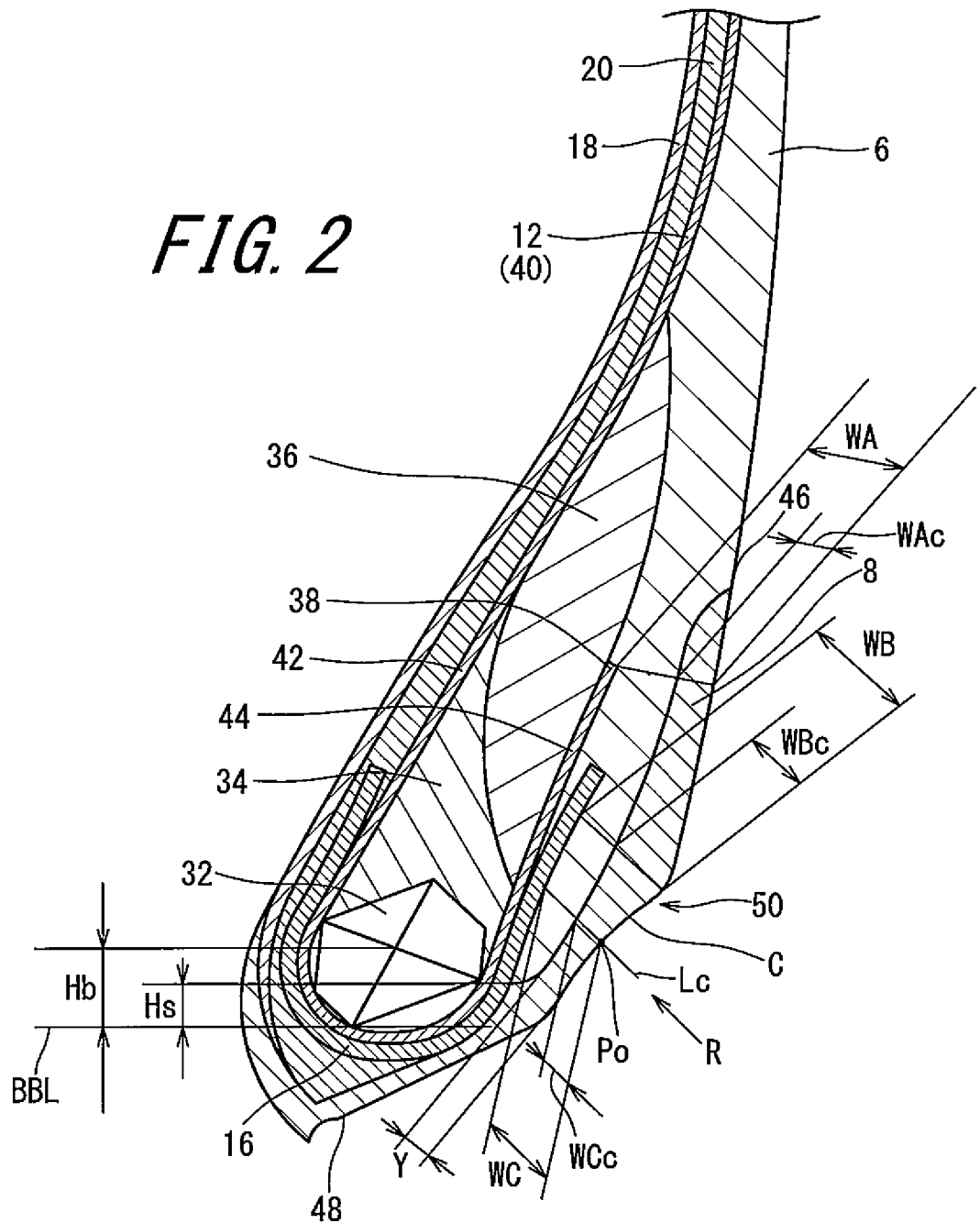
FIG. 2 is an enlarged cross-sectional view of a part of the tire shown in FIG. 1.

FIG. 2 is an enlarged cross-sectional view of the bead 10 portion of the tire 2 shown in FIG. 1. In FIG. 2, the up-down direction represents the radial direction, the left-right direction represents the axial direction, and the direction perpendicular to the surface of the drawing sheet represents the circumferential direction.

In the tire 2, the outer surface of the chafer 8 includes: a bottom surface 48 that comes into contact with a seat surface of a rim when the tire 2 is mounted on the rim; and a side surface 50 that comes into contact with a flange of the rim when the tire 2 is mounted on the rim. As illustrated in FIG. 2, on the cross-section perpendicular to the circumferential direction, the outline of the side surface 50 has an arc C that projects inward. The arc C projects inward in almost the axial direction. The center of the circle to which the arc C belongs is disposed outward of the bead 10 portion in the axial direction. The arc C extends outward from a heel of the bead 10 portion almost in the radial direction.

The action and effect of the present invention will be described below.

A tire in which a sidewall having a low loss tangent extends to a position between a chafer and a bead in order to reduce rolling resistance, is known. In the tire, a chafer having a high complex elastic modulus is not provided near the end of the turned-up portion. Under a load, the end of the turned-up portion may be greatly moved. This may cause such damage (PTL) as to remove the cord from rubber at the end of the turned-up portion. A tire in which the radially outer end of a chafer extends to a position outward of the end of a turned-up portion in order to reduce PTL while a sidewall extends to a position between the chafer and a bead, is known. However, in this tire, the extended portion constantly contacts with air also after the tire is mounted on a rim. In the chafer that is inferior to the sidewall in weather resistance, a fine crack is likely to occur in this portion. The portion is greatly distorted when the tire is inflated or running. This distortion causes the fine crack to grow. This deteriorates the quality of the appearance of the tire.

In the tire 2 according to the present invention, the sidewall 6 having a low loss tangent extends to a position between the bead 10 and the chafer 8. In the tire 2, the chafer 8 having a high loss tangent is made small. In the tire 2, energy loss is reduced. In the tire 2, rolling resistance is low.

In the tire 2 according to the present invention, the chafer 8 having a high complex elastic modulus extends to a position outward of the end 38 of the turned-up portion 44 in the radial direction. The chafer 8 inhibits a portion near the end 38 of the turned-up portion 44 from being moved. The chafer 8 reduces concentration of distortion on the end 38 of the turned-up portion 44. In the tire 2, PTL is inhibited.

In the tire 2 according to the present invention, the outline of the side surface 50 of the chafer 8 includes the arc C that extends outward from the heel of the bead 10 portion in the radial direction and projects inward. The shape allows the bead 10 portion and a rim to be in close contact with each other when the tire 2 is mounted on the rim. Furthermore, as described above, the sidewall 6, which is soft, extends to a position between the bead 10 and the chafer 8. The sidewall 6 is disposed inward of the chafer 8. The sidewall 6 allows the flange and the chafer 8 in which the outline of the side surface 50 includes the arc C to effectively come into close contact with each other. In the tire 2, the arc C formed in the outline of the side surface 50 and the sidewall 6 that extends to a position inward of the chafer 8 in the axial direction effectively inhibits the bead 10 portion from being moved. Distortion is inhibited in a portion, of the chafer 8, outward of the end 38 of the turned-up portion 44. Even in a portion, of the chafer 8, which contacts with air, crack is inhibited from growing. In the tire 2, the excellent quality of appearance is maintained.

The curvature radius R of the arc C is preferably not greater than 50 mm. When the curvature radius R is not greater than 50 mm, the thickness of the rubber, in the arc C portion, obtained by rubber of the sidewall 6 and rubber of the chafer 8 being added to each other is appropriately reduced. This prevents the bead 10 portion from being moved due to the great thickness of the rubber. In the tire 2, the bead 10 portion is inhibited from being moved. This contributes to durability of the bead 10 portion. Also in a portion, of the chafer 8, outward of the end 38 of the turned-up portion 44, crack is inhibited from growing. In the tire 2, the excellent quality of the appearance is maintained. In this view point, the curvature radius R is more preferably not greater than 35 mm. The curvature radius R is preferably not less than 20 mm. When the curvature radius R is not less than 20 mm, the thickness of the rubber of the arc C portion of the side surface 50 is appropriately maintained. This inhibits contact pressure from being reduced due to an insufficient thickness of rubber. In the tire 2, the bead 10 portion is inhibited from being moved. Also in a portion, of the chafer 8, outward of the end 38 of the turned-up portion 44, crack is inhibited from growing. In this viewpoint, the curvature radius R is more preferably not less than 25 mm.

As shown in FIG. 2, the sidewall 6 preferably extends to a position outward of the core 32 in the axial direction. In other words, the sidewall 6 and the core 32 preferably overlap each other in the axial direction. When the sidewall 6 having the loss tangent LTs which is low, extends to a position outward of the core 32 in the axial direction, the sidewall 6 effectively contributes to reduction of rolling resistance.

A double-headed arrow Hs represents a height from the bead base line to the radially inner end of the sidewall 6. A double-headed arrow Hb represents a height from the bead base line to the center of the core 32. In the tire 2, the sidewall 6 more preferably extends to a position inward of the center of the core 32 in the radial direction. That is, a ratio (Hs/Hb) of the height Hs to the height Hb is more preferably less than 1.

The ratio (Hs/Hb) is preferably not less than 0.2. When the ratio (Hs/Hb) is not less than 0.2, the chafer 8 has a sufficient thickness in the bottom surface 48 portion. In the tire 2, durability and wear resistance performance are advantageously maintained.

In FIG. 2, a point Po represents a midpoint of the arc C. A solid line Lc is a normal line, of the arc C, which is drawn from the midpoint Po. As shown in FIG. 2, in the tire 2, the sidewall 6 preferably extends to a position inward of the normal line Lc in the radial direction. In other words, the sidewall 6 preferably intersects the normal line Lc. Thus, the sidewall 6, which is soft, is disposed inward of the arc C. The sidewall 6 allows the chafer 8 and the flange to effectively come into close contact with each other. In the tire 2, the bead 10 portion is inhibited from being moved. Also in a portion, of the chafer 8, outward of the end 38 of the turned-up portion 44, distortion is inhibited. Also in a portion, of the chafer 8, which contacts with air, crack is inhibited from growing. In the tire 2, the excellent quality of the appearance is maintained.

In FIG. 2, a double-headed arrow WAc represents a thickness of the chafer 8 at the end 38 of the turned-up portion 44. The thickness WAc is measured along a normal line, of the outer surface of the bead 10 portion, which is drawn from the end 38 of the turned-up portion 44. A double-headed arrow WA represents a thickness, at the end 38 of the turned-up portion 44, obtained by the thickness of the chafer 8 and the thickness of the sidewall 6 being added to each other. The thickness WA is measured along the normal line, of the outer surface of the bead 10 portion, which is drawn from the end 38 of the turned-up portion 44.

A ratio (WAc/WA) of the thickness WAc to the thickness WA is preferably not less than 0.3. When the ratio (WAc/WA) is not less than 0.3, the chafer 8 effectively inhibits a portion near the end 38 of the turned-up portion 44 from being moved. The chafer 8 allows concentration of distortion on the end 38 of the turned-up portion 44 to be reduced. In the tire 2, PTL is inhibited. In this viewpoint, the ratio (WAc/WA) is more preferably not less than 0.4. The ratio (WAc/WA) is preferably not greater than 0.6. When the ratio (WAc/WA) is not greater than 0.6, the chafer 8 having a high loss tangent is inhibited from being enlarged. In the tire 2, energy loss is inhibited. In the tire 2, rolling resistance is low. In this viewpoint, the ratio (WAc/WA) is more preferably not greater than 0.5.

The thickness WAc is preferably not less than 2 mm. When the thickness WAc is not less than 2 mm, the chafer 8 effectively inhibits a portion near the end 38 of the turned-up portion 44 from being moved. The chafer 8 allows concentration of distortion on the end 38 of the turned-up portion 44 to be reduced. In the tire 2, PTL is inhibited. In this viewpoint, the thickness WAc is more preferably not less than 2.5 mm. The thickness WAc is preferably not greater than 6 mm. When the thickness WAc is not greater than 6 mm, the chafer 8 having a high loss tangent is inhibited from being enlarged. In the tire 2, energy loss is inhibited. In the tire 2, rolling resistance is low. In this viewpoint, the thickness WAc is more preferably not greater than 5.5 mm.

In FIG. 1, a double-headed arrow L represents a length of a straight line that connects between the radially inner end of the arc C and the radially outer end of the chafer 8. The length L is preferably not less than 35 mm. When the length L is not less than 35 mm, the chafer 8 effectively supports the turned-up portion 44 of the carcass 12 under a load. The chafer 8 inhibits a portion near the end 38 of the turned-up portion 44 from being moved. The chafer 8 allows concentration of distortion on the end 38 of the turned-up portion 44 to be reduced. In the tire 2, PTL is inhibited. In this viewpoint, the length L is more preferably not less than 40 mm. The length L is preferably not greater than 55 mm. When the length L is not greater than 55 mm, a portion, of the chafer 8, which is exposed to air when the tire 2 is mounted on a standard rim, is reduced. In the tire 2, crack is inhibited from occurring. In the tire 2, the excellent quality of the appearance is maintained. In this viewpoint, the length L is more preferably not greater than 50 mm.

In FIG. 1, a double-headed arrow M represents a width of the arc C. The width M is a distance between one end of the arc C and the other end thereof. The width M is preferably not less than 10 mm. When the width M is not less than 10 mm, the thickness of a rubber, at the arc C portion, obtained by the rubber of the sidewall 6 and the rubber of the chafer 8 being added to each other, is appropriately reduced. Thus, the bead 10 portion and the rim are brought into close contact with each other. This prevents the bead 10 portion from being moved due to the great thickness of the rubber. In the tire 2, the bead 10 portion is inhibited from being moved. This contributes to durability of the bead 10 portion. Also in a portion, of the chafer 8, outward of the end 38 of the turned-up portion 44, crack is inhibited from growing. In the tire 2, the excellent quality of the appearance is maintained. In this viewpoint, the width M is more preferably not less than 15 mm. The width M is preferably not greater than 30 mm. When the width M is not greater than 30 mm, the thickness of the rubber in the arc C portion of the side surface 50 is appropriately maintained. This inhibits contact pressure from being reduced due to an insufficient thickness of the rubber. In the tire 2, the bead 10 portion is inhibited from being moved. Also in a portion, of the chafer 8, outward of the end 38 of the turned-up portion 44, crack is inhibited from growing. In this viewpoint, the width M is more preferably not greater than 25 mm.

A ratio (Hc/Hp) of the height Hc of the outer end 46 of the chafer 8 to the height Hp of the end 38 of the turned-up portion 44 is preferably not less than 1.1. When the ratio (Hc/Hp) is not less than 1.1, the chafer 8 effectively inhibits a portion near the end 38 of the turned-up portion 44 from being moved. The chafer 8 allows concentration of distortion on the end 38 of the turned-up portion 44 to be reduced. In the tire 2, PTL is inhibited. The ratio (Hc/Hp) is preferably not greater than 1.3. When the ratio (Hc/Hp) is not greater than 1.3, a portion, of the chafer 8, which is exposed to air when the tire 2 is mounted on a standard rim, is reduced. In the tire 2, crack is inhibited from occurring. In the tire 2, the excellent quality of the appearance is maintained.

In FIG. 2, a double-headed arrow Y represents the minimal value of the thickness of the chafer 8 in the arc C portion. The thickness of the chafer 8 is measured along a straight line that is parallel to the normal line Lc at the midpoint Po. That is, the thickness Y represents a minimal value of a distance, between a point on the arc C and the axially inner side surface of the chafer 8, which is measured along a straight line that is parallel to the normal line Lc.

The thickness Y is preferably not less than 2.0 mm. When the thickness Y is not less than 2.0 mm in the chafer 8, the chafer 8 can withstand a load during running. The tire 2 having the chafer 8 prevents damage such as crack from occurring in the bead 10 due to load during running. In the tire 2, durability is advantageously maintained.

In FIG. 2, a double-headed arrow WB represents a thickness, at the radially outer end of the arc C, obtained by the thickness of the chafer 8 and the thickness of the sidewall 6 being added to each other. The thickness is measured along a straight line that is parallel to the normal line Lc. A double-headed arrow WC represents a thickness, at the midpoint Po, obtained by the thickness of the chafer 8 and the thickness of the sidewall 6 being added to each other. The thickness is measured along the normal line Lc. A ratio (WB/WC) of the thickness WB to the thickness WC is preferably not less than 1.3. When the ratio (WB/WC) is not less than 1.3, the chafer 8 and the sidewall 6 effectively prevent the turned-up portion 44 from being tilted when the tire 2 is inflated. Thus, crack is prevented from occurring. In this viewpoint, the ratio (WB/WC) is more preferably not less than 1.5. The ratio (WB/WC) is preferably not greater than 3.0. When the ratio (WB/WC) is not greater than 3.0, distortion is prevented from concentrating on the arc C portion. In the tire 2, damage due to concentration of distortion is prevented. The tire 2 has an excellent durability. In this viewpoint, the ratio (WB/WC) is more preferably not greater than 2.5.

In FIG. 2, a double-headed arrow WBc represents a thickness of the chafer 8 at the radially outer end of the arc C. The thickness WBc is measured along a straight line that is parallel to the normal line Lc.

A ratio (WBc/WB) of the thickness WBc to the thickness WB is preferably not less than 0.4. When the ratio (WBc/WB) is not less than 0.4, the chafer 8 effectively protects the bead 10 portion. The tire 2 has an excellent durability. In this viewpoint, the ratio (WBc/WB) is more preferably not less than 0.5. The ratio (WBc/WB) is preferably not greater than 0.7. When the ratio (WBc/WB) is not greater than 0.7, the chafer 8 having a high loss tangent is inhibited from being enlarged. In the tire 2, energy loss is reduced. In the tire 2, rolling resistance is low. In this viewpoint, the ratio (WBc/WB) is more preferably not greater than 0.6.

In FIG. 2, a double-headed arrow WCc represents a thickness of the chafer 8 at the midpoint Po. The thickness WCc is measured along the normal line Lc.

A ratio (WCc/WC) of the thickness WCc to the thickness WC is preferably not less than 0.3. When the ratio (WCc/WC) is not less than 0.3, the chafer 8 effectively protects the bead 10 portion. The tire 2 has an excellent durability. In this viewpoint, the ratio (WCc/WC) is more preferably not less than 0.4. The ratio (WCc/WC) is preferably not greater than 0.6. When the ratio (WCc/WC) is not greater than 0.6, the chafer 8 having a high loss tangent is inhibited from being enlarged. In the tire 2, energy loss is reduced. In the tire 2, rolling resistance is low. In this viewpoint, the ratio (WCc/WC) is more preferably not greater than 0.5.

The loss tangent LTs of the sidewall 6 is preferably not higher than 0.10. When the loss tangent LTs is not higher than 0.1 in the sidewall 6, energy loss is small. In the tire 2, rolling resistance can be made low. The loss tangent LTs is preferably not less than 0.03.

The loss tangent LTc of the chafer 8 is preferably not higher than 0.18. In the tire 2 which includes the chafer 8 having the loss tangent LTc of not higher than 0.18, energy loss is reduced. In the tire 2, rolling resistance can be made low. The loss tangent LTc is preferably not less than 0.12. The chafer 8 having the loss tangent LTc of not less than 0.12 allows excellent wear resistance to be achieved.

The complex elastic modulus Es of the sidewall 6 is preferably not less than 2 MPa. The sidewall 6 having the complex elastic modulus Es of not less than 2 MPa contributes to stiffness of the side portion of the tire 2. In the tire 2, excellent durability is maintained. The complex elastic modulus Es is preferably not higher than 8 MPa. The sidewall 6 having the complex elastic modulus Es of not higher than 8 MPa can be appropriately deformed. The sidewall 6 contributes to excellent ride comfort.

The complex elastic modulus Ec of the chafer 8 is preferably not less than 6 MPa. The chafer 8 having the complex elastic modulus Ec of not less than 6 MPa effectively protects the bead 10 portion. The tire 2 has an excellent durability. The complex elastic modulus Ec is preferably not higher than 16 MPa. In the tire 2 that includes the chafer 8 having the complex elastic modulus Ec of not higher than 16 MPa, stiffness of the side portion can be appropriately adjusted. The tire 2 provides excellent ride comfort.

In the present invention, the dimensions and angles of the tire 2 and the components of the tire 2 are measured in a state where the tire 2 is mounted on a normal rim and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Example 1

A tire of example 1 having the structure shown in FIG. 1 was obtained. The size of the tire was 11R22.5. The specifications of the tire were indicated in Table 1. In the tire, the sidewall extended to a position inward of the normal line Lc in the radial direction. This is indicated in the table as "inward of Lc" in the cell for "SW inner end position". In the tire, the ratio (Hc/Hp) was 1.2, which is not indicated in the table. The ratio (Hs/Hb) was 0.6. The loss tangent LTs was 0.06 and the loss tangent LTc was 0.15. The complex elastic modulus Es was 5 MPa, and the complex elastic modulus Ec was 10 MPa.

Comparative Example 1

A tire of comparative example 1 was a conventional tire in which a sidewall did not extend to a position between a bead and a chafer. In the tire, the chafer extended to a position between the bead and the sidewall. The outline of the side surface of the chafer did not have the arc R projecting inward. In the tire, the outline of the side surface had a shape that projected outward in the axial direction as in conventional art. The tire of comparative example 1 had the same structure as in example 1 except for shapes of the chafer and sidewall in the bead portion.

Comparative Example 2

A tire of comparative example 2 had a sidewall extending to a position between a bead and a chafer. The tire was a conventional tire in which the chafer did not extend to a position outward of the end of a turned-up portion in the radial direction. The outline of the side surface of the chafer did not have the arc R projecting inward. The outline of the side surface of the tire had a shape that projected outward in the axial direction as in conventional art. The tire of comparative example 2 had the same structure as in example 1 except for shapes of the chafer and the sidewall in the bead portion.

Comparative Example 3

A tire of comparative example 3 was a conventional tire in which the outline of the side surface of a chafer did not have the arc R projecting inward. The outline of the side surface of the tire had a shape that projected outward in the axial direction as in conventional art. The tire of comparative example 3 had the same structure as in example 1 except that, in comparative example 3, the side surface did not have the arc R projecting inward.

Example 2

A tire of example 2 was obtained in the same manner as in example 1 except that, in example 2, a sidewall did not extend to a position inward of the normal line Lc in the radial direction. "Outward of Lc" in the cell for "SW inner end position" in the table indicates that the sidewall did not extend to a position inward of the normal line Lc in the radial direction. In the tire, the ratio (Hs/Hb) was 3.0.

Examples 3 to 6

Tires of examples 3 to 6 were each obtained in the same manner as in example 1 except that the curvature radius R had the value indicated in Table 2.

Examples 7 to 9

Tires of examples 7 to 9 were each obtained in the same manner as in example 1 except that the ratio (WAc/WA) had the value indicated in Table 3.

Comparative Example 4 and Examples 10 to 11

Tires of comparative example 4 and examples 10 to 11 were each obtained as in the same manner as in example 1 except that the position of the radially outer end of a chafer was different and the length L had the value indicated in Table 3. In the tire of comparative example 4, the outer end of the chafer was disposed inward of the end of a turned-up portion in the radial direction. Therefore, values of the ratio (WAc/WA) and WAc were each 0.

[Rolling Resistance]

Rolling resistance was measured using a rolling resistance testing machine under the following measurement conditions.

Used rim: 22.5×7.50
Internal pressure: 750 kPa
Load: 24.52 kN
Speed: 80 km/h

The results are indicated below in Tables 1 to 3 as indexes with the index for comparative example 1 being 100. The less the value of the index is, the lower the rolling resistance is. The less the value of the index is, the better the evaluation is.

[Resistance to PTL]

The sample tire was mounted on a normal rim (22.5×8.25) and inflated with air to an internal pressure of 1000 kPa. The tire was mounted to a drum type tire testing machine, and a vertical load of 76.53 kN was applied to the tire. Running with the tire was performed on the drum at the speed of 20 km/h. A time until PTL occurred was measured. The results are indicated below in Tables 1 to 3 as indexes with the index for comparative example 1 being 100. The greater the value of the index is, the better the evaluation is.

[Weather Resistance]

Evaluation for ozone resistance of the sample tire was made in compliance with "Rubber, vulcanized or thermoplastic—Determination of ozone resistance" specified in JIS-K 6259. The sample tire was mounted on a normal rim (22.5×8.25), and inflated with air to an internal pressure of 800 kPa. The tire was mounted to a drum type tire testing machine, and a vertical load of 22.72 kN was applied to the tire. Running with the tire was performed on the drum at the speed of 80 km/h for 600 hours while gas having a temperature of 40° C. and an ozone concentration of 50 pphm was continuously injected onto the bead portion of the tire. After the running, carbon black was applied to the bead portion of the tire, and the number of cracks and the depths thereof were observed. Weather resistance obtained from the result was indicated below in Tables 1 to 3 as indexes with the index for comparative example 1 being 100. The greater the value of the index is, the better the evaluation is.

TABLE 1

Evaluation results

| | Comparative example 1 | Comparative example 2 | Comparative example 3 | Example 1 | Example 2 |
|---|---|---|---|---|---|
| Ratio (WAc/WA) | — | 0 | 0.4 | 0.4 | 0.4 |
| WAc [mm] | — | 0 | 4 | 4 | 4 |
| L [mm] | — | 28 | 45 | 45 | 45 |
| Y [mm] | — | — | — | 3 | 3 |
| R [mm] | — | — | — | 30 | 30 |
| Ratio (WB/WC) | — | — | — | 1.7 | 1.7 |
| SW inner end position | — | Inward of Lc | Inward of Lc | Inward of Lc | Outward of Lc |
| Rolling resistance | 100 | 80 | 85 | 85 | 90 |
| Resistance to PTL | 100 | 80 | 100 | 100 | 100 |

TABLE 1-continued

Evaluation results

| | Comparative example 1 | Comparative example 2 | Comparative example 3 | Example 1 | Example 2 |
|---|---|---|---|---|---|
| Weather resistance | 100 | 100 | 80 | 110 | 105 |

TABLE 2

Evaluation results

| | Example 3 | Example 4 | Example 5 | Example 6 |
|---|---|---|---|---|
| Ratio (WAc/WA) | 0.4 | 0.4 | 0.4 | 0.4 |
| WAc [mm] | 4 | 4 | 4 | 4 |
| L [mm] | 45 | 45 | 45 | 45 |
| Y [mm] | 3 | 3 | 3 | 3 |
| R [mm] | 15 | 20 | 50 | 70 |
| Ratio (WB/WC) | 3.0 | 2.5 | 1.7 | 1.7 |
| SW inner end position | Inward of Lc | Inward of Lc | Inward of Lc | Inward of Lc |
| Rolling resistance | 85 | 85 | 85 | 85 |
| Resistance to PTL | 100 | 100 | 100 | 100 |
| Weather resistance | 100 | 105 | 105 | 90 |

TABLE 3

Evaluation results

| | Example 7 | Example 8 | Example 9 | Comparative example 4 | Example 10 | Example 11 |
|---|---|---|---|---|---|---|
| Ratio (WAc/WA) | 0.15 | 0.2 | 0.6 | 0 | 0.4 | 0.4 |
| WAc [mm] | 1.5 | 2 | 4 | 0 | 4 | 4 |
| L [mm] | 45 | 45 | 45 | 25 | 55 | 65 |
| Y [mm] | 3 | 3 | 3 | 3 | 3 | 3 |
| R [mm] | 30 | 30 | 30 | 30 | 30 | 30 |
| Ratio (WB/WC) | 1.7 | 1.7 | 1.7 | 1.7 | 1.7 | 1.7 |
| SW inner end position | Inward of Lc | Inward of Lc | Inward of Lc | Inward of Lc | Inward of Lc | Inward of Lc |
| Rolling resistance | 80 | 80 | 90 | 80 | 90 | 90 |
| Resistance to PTL | 90 | 95 | 100 | 80 | 100 | 100 |
| Weather resistance | 110 | 110 | 105 | 120 | 105 | 90 |

As indicated in Tables 1 to 3, in the tire of the present invention, rolling resistance is reduced while durability is advantageously maintained. The evaluation results clearly indicate that the present invention is superior.

The tire according to the present invention can be mounted to various vehicles.

The foregoing description is in all aspects illustrative, and various modifications can be devised without departing from the essential features of the invention.

What is claimed is:

1. A pneumatic tire comprising:
a pair of sidewalls;
a pair of beads;
a pair of chafers; and a carcass, wherein
the carcass includes a carcass ply,
the carcass ply includes a main portion that extends from one of the beads to the other of the beads, and turned-up portions that extend in a radial direction in portions axially outward of the beads,
each chafer extends from a position axially outward of a corresponding one of the beads to a position radially inward of the corresponding one of the beads,
the sidewalls extend to positions between the beads and the chafers in portions axially outward of the turned-up portions, respectively,
the chafers extend to positions outward of ends of the turned-up portions in the radial direction,
when a side surface represents a portion, of an outer surface of each chafer, which contacts with a flange of a rim, an outline of the side surface has an arc (C) that extends from a heel of the bead portion and projects inward,
a complex elastic modulus (Es) of each sidewall is less than a complex elastic modulus (Ec) of each chafer,
a loss tangent (LTs) of each sidewall is less than a loss tangent (LTc) of each chafer,
at the radially outer ends of the arc (C), a ratio (WBc/WB) of a thickness (WBc) of each chafer to a thickness (WB) obtained by the thickness of each chafer and a thickness of each sidewall being added to each other, is not less than 0.4 and not greater than 0.7, and
a length (L) from a radially inner end of the arc (C) to a radially outer end of a corresponding one of the chafers is not less than 35 mm and not greater than 55 mm.

2. The pneumatic tire according to claim 1, wherein when (Lc) represents a normal line, of the arc (C), which is drawn from a midpoint (Po) of the arc (C), each sidewall extends to a position inward of the normal line (Lc) in the radial direction.

3. The pneumatic tire according to claim 1, wherein a curvature radius (R) of the arc (C) is not less than 20 mm and not greater than 50 mm.

4. The pneumatic tire according to claim 3, wherein the curvature radius (R) of the arc (C) is not less than 25 mm.

5. The pneumatic tire according to claim 1, wherein, at the ends of the turned-up portions, a ratio (WAc/WA) of a thickness (WAc) of each chafer to a thickness (WA) obtained by the thickness of each chafer and a thickness of each sidewall being added to each other, is not less than 0.3 and not greater than 0.6.

6. The pneumatic tire according to claim 1, wherein a thickness (WAc) of each chafer is not less than 2 mm and not greater than 6 mm at the ends of the turned-up portions.

7. The pneumatic tire according to claim 1, wherein a minimal value (Y) of a thickness of each chafer in the arc (C) portion, is not less than 2.0 mm.

8. The pneumatic tire according to claim 1, wherein a ratio (WB/WC) of a thickness (WB), at a radially outer end of the arc (C), obtained by a thickness of each chafer and a thickness of each sidewall being added to each other, relative to a thickness (WC), at a midpoint (Po) of the arc (C), obtained by a thickness of each chafer and a thickness of each sidewall being added to each other, is not less than 1.3 and not greater than 3.0.

9. The pneumatic tire according to claim 1, wherein
the complex elastic modulus (Es) is not less than 2.0 MPa and not higher than 8.0 MPa, and
the complex elastic modulus (Ec) is not less than 6.0 MPa and not higher than 16 MPa.

10. The pneumatic tire according to claim 1, wherein
the loss tangent (LTs) is not less than 0.03 and not higher than 0.1, and
the loss tangent (LTc) is not less than 0.12 and not higher than 0.18.

11. The pneumatic tire according to claim 1, wherein the pneumatic tire is used for a rim in which an angle of a seat surface of the rim relative to an axial direction is 15°.

12. The pneumatic tire according to claim 1, wherein a width of the arc (C) is not less than 10 mm and not greater than 30 mm.

* * * * *